United States Patent [19]

Smith et al.

[11] 4,151,003

[45] Apr. 24, 1979

[54] VISCOSITY MODIFICATION OF BITUMINOUS MATERIALS

[75] Inventors: Clay D. Smith; Douglas V. Keller, Jr., both of Lafayette, N.Y.

[73] Assignee: Otisca Industries, Ltd., Syracuse, N.Y.

[21] Appl. No.: 662,619

[22] Filed: Mar. 1, 1976

[51] Int. Cl.² ............................................. C08L 95/00
[52] U.S. Cl. .................. 106/278; 106/281 R; 106/284
[58] Field of Search ................ 106/278, 280, 281, 284

[56] References Cited

U.S. PATENT DOCUMENTS

| | | | |
|---|---|---|---|
| 2,524,590 | 10/1950 | Boe | 106/278 |
| 3,313,636 | 4/1967 | Blair et al. | 106/278 |
| 3,314,907 | 4/1967 | Fronczak | 106/278 |
| 3,536,509 | 10/1970 | Tay | 106/193 M |

OTHER PUBLICATIONS

Rose et al., The Condensed Chemical Dictionary, Seventh Edition, Pub'd by Van Nostrand Reinhold Co., N.Y., p. 963, "Trichlorofluoromethane", 1966.

*Primary Examiner*—Lorenzo B. Hayes
*Attorney, Agent, or Firm*—Strauch, Nolan, Neale, Nies & Kurz

[57] ABSTRACT

Methods of modifying the viscosity of bituminous materials in which a fluoro or chlorofluoro derivative of a lower alkane is mixed therewith, and processes involving and employing products so modified.

11 Claims, 3 Drawing Figures

VISCOSITY MODIFICATION OF BITUMINOUS MATERIALS

This application is a continuation of application Ser. No. 493,475 filed July 31, 1974 (now abandoned). The latter is a continuation-in-part of application Ser. No. 460,558 filed Apr. 12, 1974 (now U.S. Pat. No. 3,941,679).

The present invention relates to viscosity modification and, more particularly, to novel improved techniques and materials for modifying the viscosity of hydrocarbonaceous materials.

In the discussion of our invention which follows the terms "hydrocarbonaceous materials" and "bituminous materials" have been assigned the following meanings:

"Hydrocarbonaceous materials"—the class of materials which includes bituminous materials, manufactured products such as raffinates and materials obtained by the distillation of coal such as creosote, for example; and synthetic hydrocarbons with characteristics or properties similar to those of naturally occurring materials.

"Bituminous materials"—native substances containing liquid, solid, or semisolid hydrocarbons, whether obtained from conventional petroleum deposits, tar sands, oil shales, or other sources. Examples of bituminous materials are crude oils, the organic fractions which can be recovered from tar sands and oil shales, asphalts, pitches, and tars.

One application in which our invention can be used to particular advantage is the pipeline transport of crude oils, the tarlike bitumens extracted from tar sands, and other viscous hydrocarbons.

Transportation of crude oils and tar sand bitumens and other viscous hydrocarbonaceous materials to refineries, ports, etc. is a major technological and economic problem in sub-arctic and arctic regions and in other cold climates because this involves the moving of high viscosity products over vast distances in ambient temperatures as low as −40° to 60° F. The problem of keeping the viscosity of the product sufficiently low to permit it to be moved without consuming inordinate, if not unavailable, amounts of energy is one for which a satisfactory solution has not yet been found.

Heating the product to reduce its viscosity is probably the solution which has most often been proposed. Aside from the cost of the energy itself, however, there is the problem of insulating the pipeline, often for hundreds of miles. Insulation is needed both to maintain the viscosity of the product low enough to pump it and to protect the often fragile terrain over which such pipelines will necessarily have to pass. Protection of the terrain is necessary both for environmental reasons and because the tundra and muskeg found in sub-arctic and arctic regions does not have the mechanical strength necessary to support a pipeline when it is thawed.

We have now discovered a novel technique for reducing the viscosity of crude oils, tar sand bitumens, and similar products to a level where they can be transported through pipelines in low temperature environments without heating the product and without expending more than a modest amount of energy to move the product. In our process we mix with the product before it is moved one or more chlorofluoro or fluoro derivates of a lower alkane. Trichlorofluoromethane ($CCl_3F$) is preferred. Other viscosity modifiers which may be employed contain $CCl_3F$ mixed with one or more of the following compounds:

Dichlorodifluoromethane ($CCl_2F_2$)
Monochlorotrifluoromethane ($CClF_3$)
Tetrafluoromethane ($CF_4$)
Monochlorodifluoromethane ($CHClF_2$)
Trichlorotrifluoroethane ($C_2Cl_3F_3$)
Dichlorotetrafluoroethane ($C_2Cl_2F_4$)
Tetrachlorodifluoroethane ($C_2Cl_4F_2$)

In warmer seasons use of the viscosity modifier may not be required. As temperatures fall, however, increasing amounts of the modifier can be added to keep the viscosity of the product from increasing or at least low enough that it can be moved with only a moderate expenditure of energy and, typically, at ambient temperature.

As the requisite viscosity reduction can normally be obtained without adding heat to the product, the technological problems involved in and costs of adding large amounts of heat to the product are avoided (The use of heat and/or other viscosity modifying or pumpability improving techniques in combination with fluoroalkane and chlorofluoroalkane viscosity modifers is by no means intended to be excluded from the compass of our invention, however). Also, only relatively light insulation will typically be required because it need, normally, do nothing more than protect the pipeline from the effects of permafrost.

The boiling points of the viscosity modifers we employ are low. Accordingly, they can be stripped from the product at the delivery point at small expense. Recovery rates approaching 100 percent are easily attained.

Furthermore, the viscosity modifiers we employ are not flammable. They have low heats of vaporization and low viscosities and surface tensions, all of which are desirable. They do not react with hydrocarbons and are non-toxic and non-corrosive. The compounds are, for the most part, available in large quantities at reasonable cost.

Techniques employing other materials for reducing the viscosity of hydrocarbonaceous materials and thereby facilitating their transportation are described in U.S. Pat. Nos. 3,490,471 issued Jan. 20, 1970; 3,527,692 issued Sept. 8, 1970; 3,618,624 issued Nov. 9, 1971; and 3,675,671 issued July 11, 1972. In no case, however, do these patents disclose viscosity modifiers having the unique combination of advantageous properties possessed by the viscosity modifiers we employ.

Another application where advantage can be taken of the principles of the present invention is in the viscosity modification of asphalts, creosotes, and similar native and synthetic hydrocarbonaceous materials. These and similar products are widely used to coat and waterproof paper, asbestos, wood, cement blocks and other castings, and other artifacts.

One requisite in such applications is that the coating material completely cover the exposed surfaces of the artifact. This goal is pursued in the conventional method of applying such materials by heating the product, decreasing its viscosity to a level where it will readily flow over the surfaces of the object being coated.

However, the cold surfaces of the article will often chill the coating material to the point where it will cease to flow as soon as the coating material contacts the object. As a consequence, uniform or even incomplete coatings often result.

This problem can be avoided by reducing the viscosity of the coating material with a modifier as described above rather then heating the material. This permits the flowability of the coating material to be maintained throughout the application because the material is applied at ambient temperature, and its viscosity therefore does not increase during the application process.

Hardening of the coating follows as the viscosity modifier evolves, either under ambient conditions or under artifical conditions which will hasten the evolution. For example, the coating may be heated to hasten the evolution of the viscosity modifier therefrom. In any case removal of the viscosity modifier will typically not require more than a few hours at most.

The viscosity modifier can be recovered if justified by the economics of the application. If not, the modifier can simply be allowed to escape or be discharged into the ambient surroundings because of the non-corrosive, non-toxic properties of the compounds we employ.

A related application of the invention is the cold patching of roads, parking lots, runways, and the like. Reducing the viscosity of the road tar or other hydrocarbonaceous material employed as a binder in patching compositions permits cold patches to be applied in cold weather even with moisture present, an advantage not enjoyed by present road patching compositions. Furthermore, the strength of the patching material and of the bond between the patching and the original material to which the patch is applied will typically surpass the strength of the latter, another decided benefit.

In fact, the superior physical properties of the novel compositions we have invented can made it feasible to use them for the original construction in the stead of the materials which are conventionally employed.

A number of hydrocarbon based coating, patching, and similar compositions which contain a solvent or viscosity modifier are disclosed in U.S. Pat. Nos. 835,113 issued Nov. 6, 1906; 1,558,082 issued Oct. 20, 1925; 1,970,164 issued Aug. 14, 1934; 2,027,686 issued Jan. 14, 1936; 2,201,981 issued May 28, 1940; 2,270,047 issued Jan. 13, 1942; 2,888,357 issued May 26, 1959; 3,434,851 issued Mar. 25, 1969; and 3,549,391 issued Dec. 22, 1970. Again, however, we consider the previously proposed compositions inferior because they use viscosity modifiers which do not have the novel combination of advantages possessed by those we employ.

The amount of the viscosity modifier which is employed in the practice of our invention can vary from a few volume percent to the point where the modifier constitutes almost the entire bulk of the mixture, depending upon the application at hand. In most cases, the viscosity modifier will constitute from 10 to 70 percent based on the total volume of the mixture of hydrocarbonaceous material and viscosity modifier.

From the foregoing it will be apparent to the reader that one important and primary object of the present invention resides in the provision of novel, improved methods for modifying the viscosity of hydrocarbonaceous materials.

Another primary and also important object of the invention resides in the provision of novel, viscosity modified hydrocarbonaceous materials.

A further primary and important object of the invention is the provision of novel methods for facilitating the movement of hydrocarbonaceous materials from one place to another.

Related objects of the invention reside in providing novel methods for applying coatings, patches, and the like.

Further, also important but more specific objects of the invention reside in the provision of methods for modifying the viscosity of hydrocarbonaceous materials with chlorofluoro and fluoro derivatives of lower alkanes, in the provision of hydrocarbonaceous materials thus modified, and in the provision of methods for using such materials and compositions containing them.

Other important objects and features and further advantages of the invention will become apparent from the appended claims and as the ensuing detailed description and discussion of representative applications of the principles of our invention proceeds in conjunction with the accompanying drawing, in which:

Figure 1:
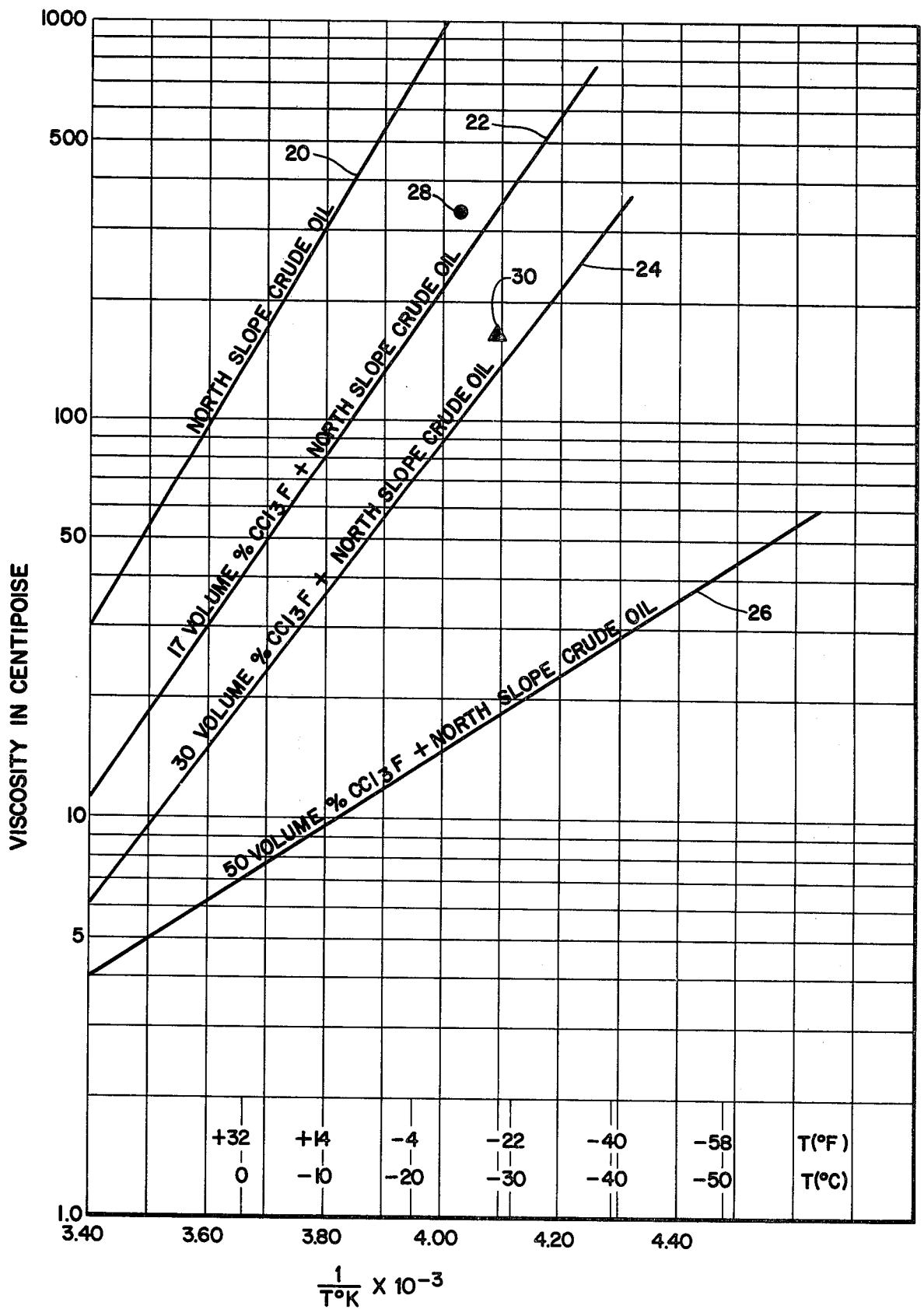
FIG. 1 is a graph which shows how the viscosity of a North Slope crude oil can be so modified in accord with the principles of the present invention as to make the crude pumpable at arctic temperatures without the addition of heat and with the expenditure of only moderate amounts of energy.

Referring now to the drawing, FIG. 1 shows in graphic form the remarkable reduction in viscosity obtained by mixing viscosity modifiers of the character described above with crude oils.

The oil employed in the tests from which the graphically displayed data was obtained is a North Slope crude with a specific gravity of 0.882 obtained from Exxon Corporation. This crude is virtually a solid at the $-60°$ F. temperatures reached in Arctic regions in the wintertime.

Economics dictate that the viscosity of a crude be not greater than about 100 centipoises while it is pumped. As shown by curve 20 in FIG. 1, this means that the crude in question must be kept at above-freezing temperatures if heat alone is to be relied upon for viscosity reduction.

However, curve 22 shows that, by mixing 17 percent by volume trichlorofluoromethane with the same crude, it can be pumped at temperatures approaching 0° F. By increasing the volume of $CCl_3F$ to 30 percent the pumping temperature can be reduced to ca. $-10°$ F. (curve 24); and, by increasing the viscosity modifier volume to 50 percent, the viscosity of the crude remains below the economically pumpable 100 centipoise level at temperatures well below those typically encountered in Arctic regions (curve 26). At $-60°$ F., for example, the viscosity of the mixture is only ca. 45 centipoises.

Points 28 and 30 of FIG. 1 shows that mixtures of chlorofluoroalkyls are effective viscosity modifiers. These points represent data obtained from tests of mixtures which were, respectively, by volume: 88 percent crude, 10 percent $CCl_3F$, and 2 percent $CHClF_2$ and 80 percent crude, 10 percent $CCl_3F$, and 10 percent $CHClF_2$. The same North Slope crude was employed in these tests.

FIG. 1 shows that our novel viscosity modifiers are effective over a wide temperature. For example, though beyond the limits of the Figure, a mixture of 83 percent by volume of the North Slope crude and 17 percent $CCl_3F$ is 50 percent less viscous at room temperature than the crude by itself. Even at relatively high temperatures, therefore, advantage can be taken of our novel viscosity modifiers to facilitate the handling and transport of hydrocarbonaceous materials.

Tests were also made to confirm that the viscosity modifier could be readily and economically stripped from the crude. The viscosity modifiers were removed as described in parent application Ser. No. 460,558. The tests showed that virtually all of the modifier could be recovered at temperatures below 100° C. in the case of $CCl_3F$ and below 50° F. in the case of $CHClF_2$.

To show that our novel technique for modifying the viscosity of hydrocarbonaceous materials so they can be economically pumped through pipelines is not limited to conventional crudes, tests similar to those described above were made substituting for the North Slope crude a bitumen recovered from Athabaska tar sands. This bitumen has a viscosity exceeding 20,000 centipoises at room temperature.

Figure 2:
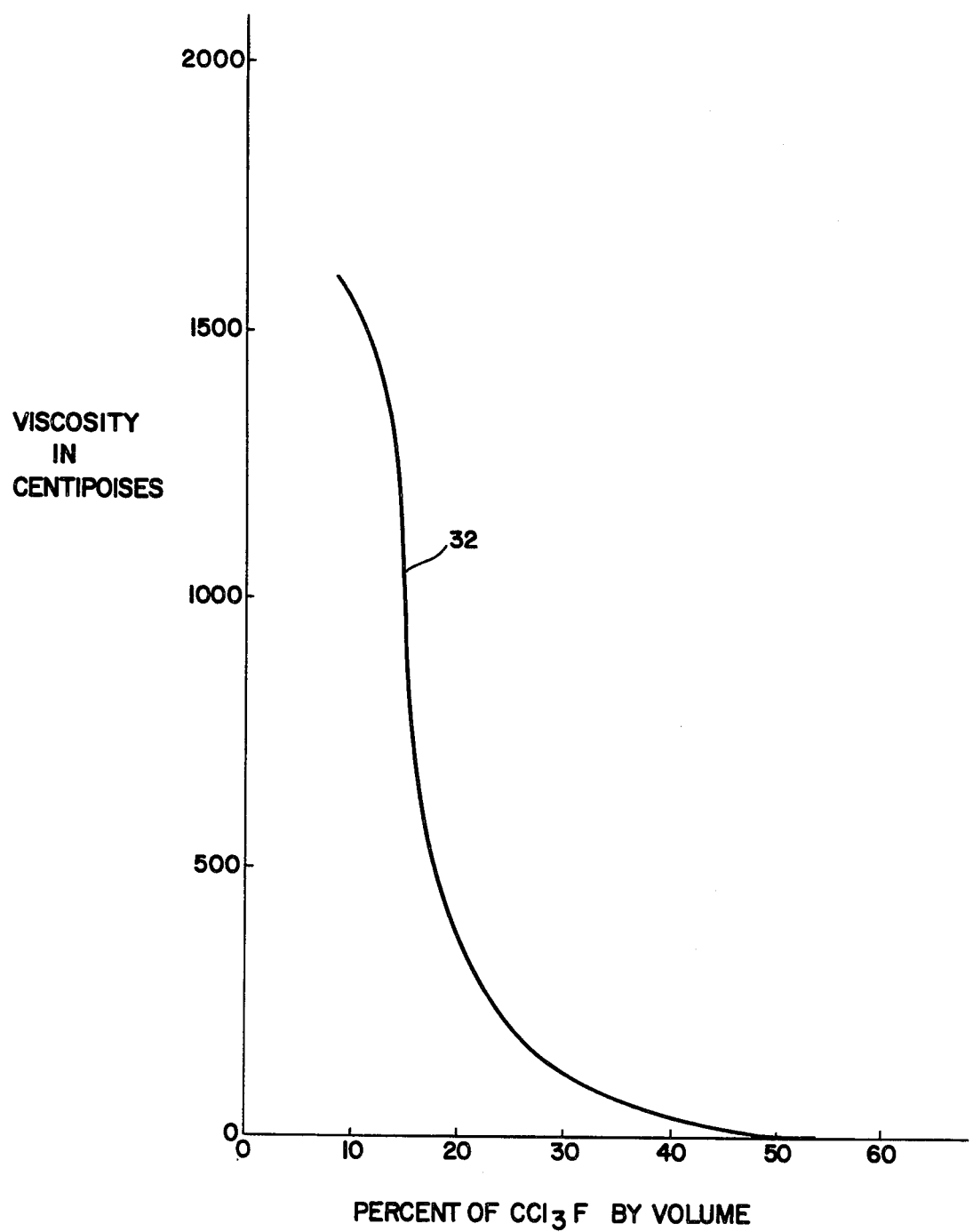
FIG. 2 shows how varying amounts of one of our novel viscosity modifiers effect the viscosity of bitumen extracted from Athabaska tar sands.

Curve 32 in FIG. 2 shows that the viscosity of the bitumen can be reduced by two orders of magnitude and more by mixing with it modest amounts of $CCl_3F$.

Figure 3:
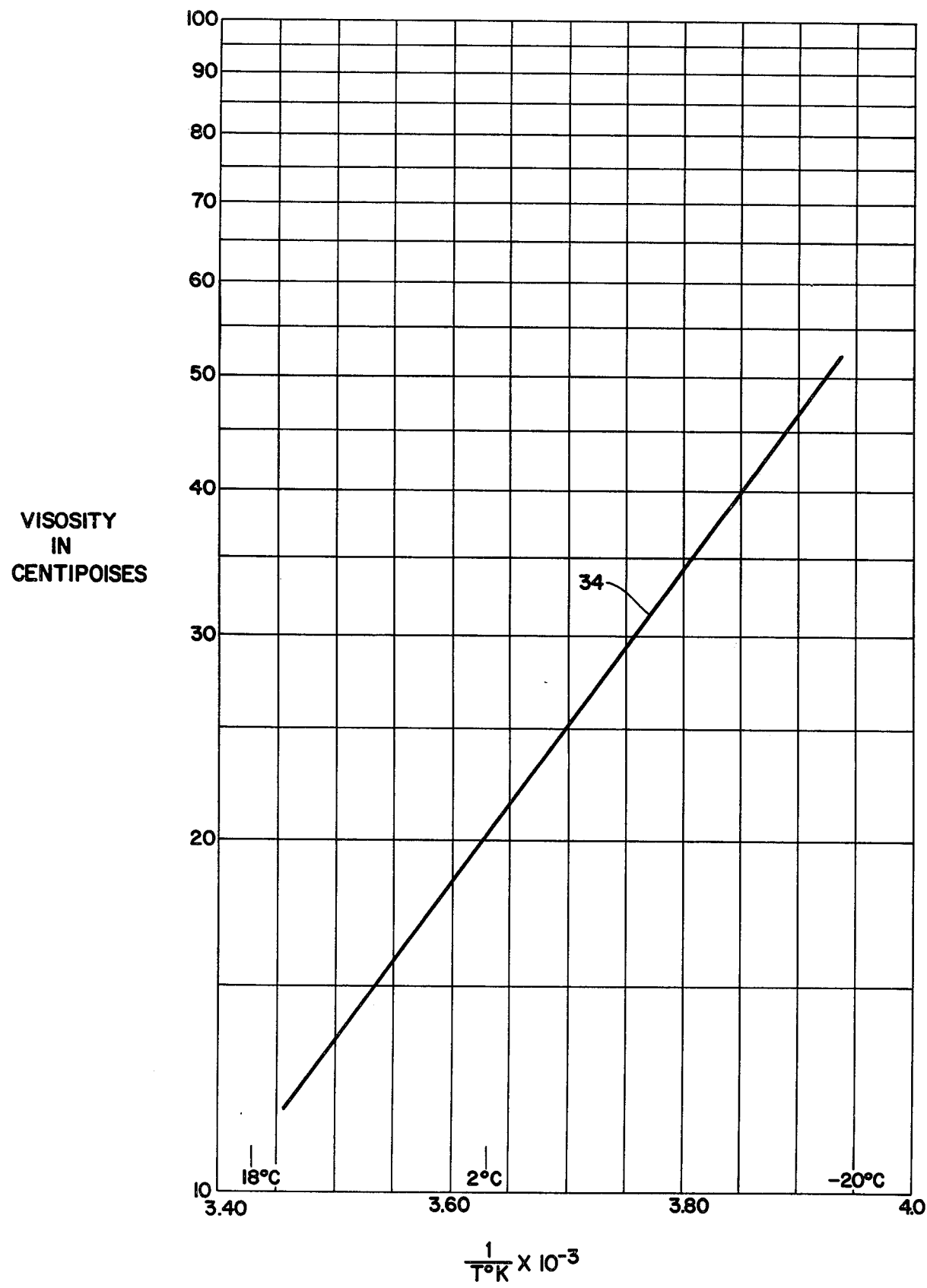
FIG. 3 shows the effect which a selected proportion of the modifier had on the bitumen at various temperatures.

FIG. 3 shows, graphically, the effect on the viscosity of the bitumen which was obtained by mixing with the bitumen 40 percent by volume of chlorotrifluoromethane. As indicated by curve 34, at temperatures approaching 0° F., the viscosity of the mixture was still 50 percent below the level necessary for economical pumping.

To demonstrate how the principles of the present invention can be employed to advantage in applications involving coatings and coverings, a mixture of 70 percent by volume $CCl_3F$ and 30 percent asphalt was prepared by agitating the constituents in a beaker with a laboratory model Lightning mixer.

A piece of one-half inch thick CDX plywood was coated with the viscosity modified material. Tar (or roofing) paper was also coated with the mixture and placed on the plywood. The resulting bond between the roofing paper and the plywood was relatively uniform and of sufficient strength to hold the tar paper in place.

At approximately one-half hour intervals, two additional plies of the roofing paper were cemented to the first ply with the viscosity modified asphalt. A coating of the material was applied to the third ply.

In none of these applications was the viscosity modified asphalt heated.

The resulting three-ply, simulated roof had a good appearance. After drying for 24 hours at ambient temperature a strong bond developed between the roofing paper plies and between the latter and the plywood substrate.

In another test, a conventional concrete building block was coated with viscosity modified asphalt as discussed above, again at ambient temperature. The material readily penetrated approximately one-sixteenth inch into the block. All of the pores opening onto the exterior of the block appeared to be sealed. To ensure that they were, a second coat of the viscosity modified asphalt was applied.

Standing water would not penetrate the dried coating. The bond between it and the concrete block was rated excellent.

In a companion test, unprimed sheet metal was coated with the viscosity modified asphalt at ambient temperature. After the material had dried for 24 hours, the specimen was bent to a three inch radius. The asphalt cracked, but did not flake off. This is an indication that a good bond had formed between the coating material and the sheet material substrate.

As discussed above, viscosity modified hydrocarbonaceous materials in accord with the principles of the present invention can also be employed to advantage in road patching and similar compositions. To demonstrate this aspect of the invention, equal volumes of asphalt and trichlorofluoromethane were blended as discussed above. This composition was mixed with clay which had been oven dried for three hours at 350° F. in the proportion of 20 percent by weight clay and 80 percent viscosity modified asphalt. The $CCl_3F$-asphalt-clay composition was blended with crushed, size IA limestone to form a cold patch material.

This was applied to a concrete surface which had been primed with the 50 percent asphalt, 50 percent $CCl_3F$ mixture. The patch was approximately six inches wide by twelve inches long and two inches deep. After it had dried for twelve hours, the patch would support the weight of a man without any appearance of plastic deformation.

The $CCl_3F$-asphalt-clay mixture was also applied as a coating to a concrete block. It was found that the extent to which blistering was present in the coating was significantly lower than is typically the case when conventional asphaltic coatings are employed.

The invention may be embodied in other specific forms without departing from the spirit or essential characteristics thereof. For example, other fillers and adjuvants can be employed to tailor the composition to the requirements of a particular application or to alter the characteristics of a particular hydrocarbonaceous material as required by the circumstances at hand. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A stable plastic or flowable composition consisting essentially of a viscous bituminous material in stable solution in a non-azetropic, non-flammable, non-toxic viscosity modifier which is a liquid at a temperature of 75° F. and ambient pressure, said viscosity modifier being essentially free of aqueous fluids, emulsifiers, and propellant gases and consisting of trichlorofluoromethane alone or in admixture with at least one of the group consisting of dichlorodifluoromethane, monochlorotrifluoromethane, tetrafluoromethane, monochlorodifluoromethane, trichlorotrifluoroethane, dichlorotetrafluoroethane, and tetrachlorodifluoroethane in an amount effective to produce a reduction in the viscosity of the bituminous material at ambient pressures and temperatures.

2. A composition according to claim 1, in which the viscosity modifier constitutes from 10 to 70 percent by volume based on the total volume of the solution.

3. A composition according to claim 1, containing a filler in admixture with said bituminous material and said viscosity modifier.

4. A composition according to claim 1, in which the bituminous material is a crude oil or the organic fraction of a tar sand or oil shale.

5. A composition according to claim 1, in which the bituminous material is an asphalt or tar.

6. A composition according to claim 1, which has a viscosity not exceeding about 100 centipoises under ambient conditions.

7. A method of reducing the viscosity of a bituminous material which comprises the step of dissolving said material in a non-azeotropic, non-flammable, non-toxic viscosity modifier which is essentially free of aqueous fluids and propellant gases and is a liquid at a temperature of 75° F. and ambient pressure to produce a stable solution of bituminous material in the viscosity modifier, said viscosity modifier consisting of trichlorofluoromethane alone or in admixture with at least one of the group consisting of dichlorodifluoromethane, monochlorotrifluoromethane, tetrafluoromethane, monochlorodifluoromethane, trichlorotrifluoroethane, dichlorotetrafluoroethane and tetrachlorodifluoroethane in an amount effective to produce a reduction in the viscosity of the bituminous material at ambient pressures and temperatures.

8. A method according to claim 7, in which the bituminous material is dissolved in from 10 to 70 percent by volume of viscosity modifier based on the total volume of the solution.

9. A method according to claim 7, together with the step of mixing a filler with said bituminous material and viscosity modifier.

10. A method according to claim 7, in which the bituminous material is a crude oil on the organic fraction of a tar sand or oil shale.

11. A method according to claim 7, in which the bituminous material is an asphalt or tar.

* * * * *

UNITED STATES PATENT AND TRADEMARK OFFICE
CERTIFICATE OF CORRECTION

PATENT NO. : 4,151,003
DATED : April 24, 1979
INVENTOR(S) : Clay D. Smith; Douglas V. Keller, Jr.

It is certified that error appears in the above–identified patent and that said Letters Patent are hereby corrected as shown below:

Column 6, line 42, Claim 1    after "stable" insert --,--.

Signed and Sealed this

Thirty-first Day of July 1979

[SEAL]

Attest:

Attesting Officer

LUTRELLE F. PARKER
Acting Commissioner of Patents and Trademarks